United States Patent
Yang et al.

(10) Patent No.: US 10,791,266 B1
(45) Date of Patent: Sep. 29, 2020

(54) IMAGE PROCESSING CIRCUIT AND METHOD

(71) Applicant: NOVATEK Microelectronics Corp., Hsin-Chu (TW)

(72) Inventors: Yun-Shu Yang, Changhua County (TW); Yen-Tao Liao, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 16/449,436

(22) Filed: Jun. 23, 2019

(51) Int. Cl.
*H04N 5/202* (2006.01)
*H04N 5/232* (2006.01)
*H04N 5/341* (2011.01)

(52) U.S. Cl.
CPC ......... *H04N 5/23229* (2013.01); *H04N 5/202* (2013.01); *H04N 5/341* (2013.01)

(58) Field of Classification Search
CPC ........ H04N 1/6025; H04N 9/69; H04N 5/202; H04N 5/06; G09G 2320/0276; G09G 2320/0673; G09G 5/06
See application file for complete search history.

(56) References Cited

U.S. PATENT DOCUMENTS

| | | | |
|---|---|---|---|
| 6,441,870 B1 | 8/2002 | Rapaich | |
| 7,205,970 B2 | 4/2007 | Kim | |
| 8,325,121 B2 | 12/2012 | Chen | |
| 9,615,003 B2 | 4/2017 | Lee | |
| 2002/0190931 A1 | 12/2002 | Thebault | |
| 2006/0145982 A1 | 7/2006 | Tseng | |
| 2007/0229423 A1 | 10/2007 | Tyrrell | |
| 2012/0194571 A1 | 8/2012 | Chen | |
| 2016/0065793 A1 | 3/2016 | Lee | |
| 2017/0116934 A1 | 4/2017 | Tien | |
| 2017/0150131 A1* | 5/2017 | Van Putten | G02B 30/27 |
| 2019/0333196 A1* | 10/2019 | Kim | G06T 5/50 |

OTHER PUBLICATIONS

Yun-Shu Yang et al., Title: Gray level adjustment circuit and method, pending U.S. Appl. No. 16/547,586, filed Aug. 22, 2019.

* cited by examiner

*Primary Examiner* — Antonio A Caschera
(74) *Attorney, Agent, or Firm* — Winston Hsu

(57) ABSTRACT

The image processing circuit includes a receiving circuit, configured to receive a plurality of pixels of a video frame, wherein the plurality of pixels are corresponding to a plurality of pixel locations, a pixel location of a pixel is corresponding to a gamma category value, and the gamma category value is either a gamma-high value or a gamma-low value; and a gamma table circuit, configured to obtain a gamma table; and a compensation circuit, configured to generate an output pixel value; wherein a plurality of first pixel locations are corresponding to a plurality of gamma-high tables, and the plurality of gamma-high tables are mutually different; wherein a plurality of second pixel locations are corresponding to a plurality of gamma-low tables, and the plurality of gamma-low tables are mutually different.

21 Claims, 5 Drawing Sheets

IMAGE PROCESSING CIRCUIT AND METHOD

BACKGROUND OF THE INVENTION

1. Field of the Invention

The present invention relates to an image processing circuit and an image processing method, and more particularly, to an image processing circuit and an image processing method capable of preventing grid phenomenon.

2. Description of the Prior Art

A liquid crystal display (LCD) generally has an off-angle viewing problem where the image may possess color distortion or color washout at a side view angle, which means a user feels the display panel brighter when looking at the side view angle. In the prior art, two gamma lookup tables (LUTs) are applied to modify the pixel data (e.g., gray level data) to mitigate the off-angle viewing problem. In detail, the two gamma LUTs include a high gamma LUT that converts input data to output data of higher gray levels and a low gamma LUT that converts input data to output data of lower gray levels. Each pixel data is converted by one of the gamma LUTs. For example, a pixel may be divided into two parts, where one part displays pixel data converted by the high gamma LUT and the other part displays pixel data converted by the low gamma LUT. If these two pixel data are identical before the conversions, the high gamma LUT may output pixel data of higher gray level which presents higher brightness and the low gamma LUT may output pixel data of lower gray level which presents lower brightness. In another example, one pixel displays pixel data converted by the high gamma LUT and a neighboring pixel displays pixel data converted by the low gamma LUT. In such a situation, the off-angle viewing problem in a panel may be mitigated, and the improvement is much evident in a vertical alignment (VA) panel.

However, the implementations of different gamma LUTs for neighboring pixels result in a side effect where there may be grid phenomenon appearing in the image. The grid phenomenon, which may be generated due to the gray level difference between the high/low gamma LUTs, reduces visual experience. Thus, there is a need for improvement over the prior art.

SUMMARY OF THE INVENTION

It is therefore an objective of the present invention to provide an image processing circuit and an image processing method capable of preventing grid phenomenon.

An embodiment of the present invention discloses an image processing circuit. The image processing circuit comprises a receiving circuit, configured to receive a plurality of pixels of a video frame, wherein the plurality of pixels are corresponding to a plurality of pixel locations, a pixel location of a pixel is corresponding to a gamma category value, and the gamma category value is either a gamma-high value or a gamma-low value; and a gamma table circuit, configured to obtain a gamma table corresponding to the pixel location according to the gamma category value; and a compensation circuit, configured to compensate an input pixel value of the pixel, to generate an output pixel value corresponding to the pixel location by referring to the gamma table; wherein a plurality of first pixel locations are corresponding to the gamma-high value, the plurality of first pixel locations are corresponding to a plurality of gamma-high tables referred to by the compensation circuit, and the plurality of gamma-high tables corresponding to the plurality of first pixel locations are mutually different; wherein a plurality of second pixel locations are corresponding to the gamma-low value, the plurality of second pixel locations are corresponding to a plurality of gamma-low tables referred to by the compensation circuit, and the plurality of gamma-low tables corresponding to the plurality of second pixel locations are mutually different.

An embodiment of the present invention further discloses image processing method. The image processing method comprises receiving a plurality of pixels of a video frame; obtaining a plurality of pixel locations and a plurality of gamma category values, wherein a pixel location of a pixel is corresponding to a gamma category value, and the gamma category value is either a gamma-high value or a gamma-low value; obtaining a plurality of gamma tables corresponding to the plurality of pixel locations according to the plurality of gamma category values; and compensating a plurality of input pixel values of the plurality of pixels, to generate a plurality of output pixel values corresponding to the plurality of pixel locations by referring to the plurality of gamma tables; wherein a plurality of first pixel locations are corresponding to the gamma-high value, the plurality of first pixel locations are corresponding to a plurality of gamma-high tables referred to by the compensation circuit, and the plurality of gamma-high tables corresponding to the plurality of first pixel locations are mutually different; wherein a plurality of second pixel locations are corresponding to the gamma-low value, the plurality of second pixel locations are corresponding to a plurality of gamma-low tables referred to by the compensation circuit, and the plurality of gamma-low tables corresponding to the plurality of second pixel locations are mutually different.

These and other objectives of the present invention will no doubt become obvious to those of ordinary skill in the art after reading the following detailed description of the preferred embodiment that is illustrated in the various figures and drawings.

DETAILED DESCRIPTION

In embodiments of the disclosure, pixels located at different pixel locations may correspond to a gamma category value which can be one of a gamma-high value and a low-gamma value. Pixels located at different pixel locations corresponding to the same gamma category value can be arranged to be compensated according to different gamma tables rather than the same gamma table. More accurate compensation may be achieved.

Figure 1:
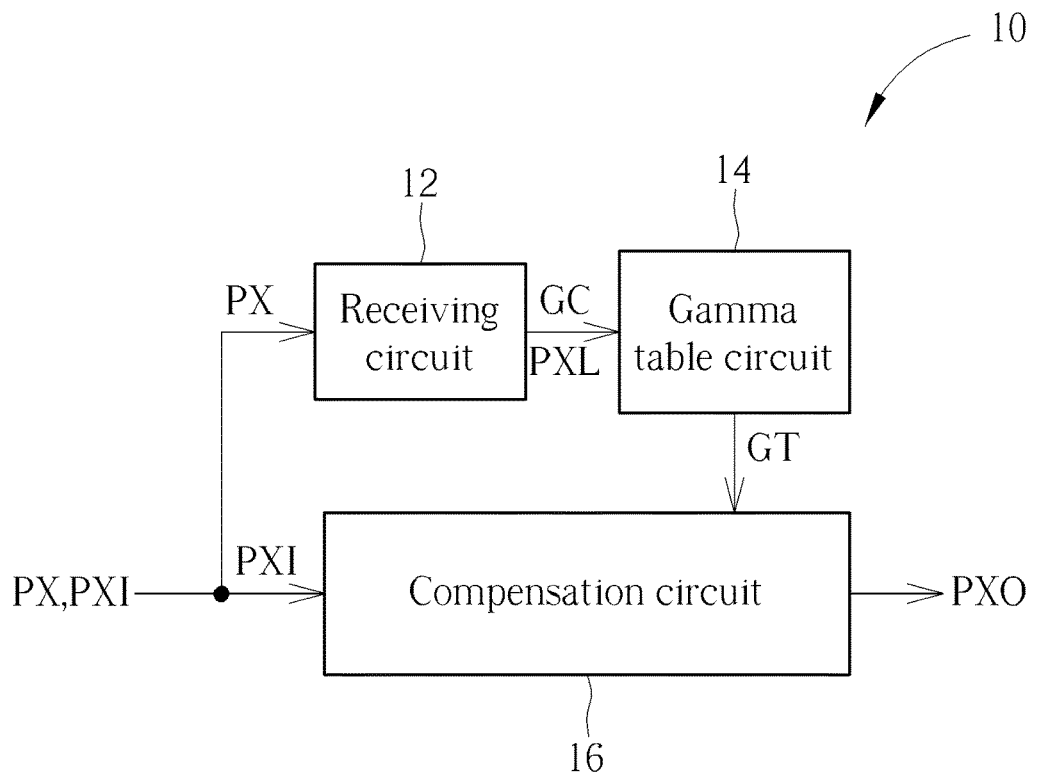
FIG. 1 is a schematic diagram of an image processing circuit according to an embodiment of the present invention.

FIG. 1 is a schematic diagram of an image processing circuit 10 according to an embodiment of the present invention. It is noted that the circuit blocks are illustrated separately but can be integrated or separated in different implementations. The image processing circuit 10 comprises a receiving circuit 12, a gamma table circuit 14 and a compensation circuit 16. The receiving circuit 12 receives a plurality of pixels PX of a video frame VF. The plurality of pixels PX are corresponding to (or represents) a plurality of input pixel values PXI and a plurality of pixel locations PXL. Each pixel PX or each pixel location PXL may be corresponding to a gamma category value GC. The gamma category value GC is either a gamma-high value GH or a gamma-low value GL. The receiving circuit 12 may access (or refer to) a look-up table LUT_GC to obtain the gamma category value GC corresponding to the pixel location PXL. The look-up table LUT_GC can represents a relationship between different pixels locations PXL and different gamma category value GC. In an embodiment, the look-up table LUT_GC may be stored in a first storage circuit 11, e.g., registers, within the image processing circuit 10, but not limited thereto and can be implemented in any known manner. For example, the look-up table LUT_GC may be implemented in hardware or software. The plurality of pixels PX may be gray-level pixels of the video frame VF. The plurality of pixels PX may also be red-pixels, blue-pixels or green pixels of the video frame VF.

The gamma table circuit 14 is configured to obtain a gamma table GT corresponding to the pixel location PXL according to the gamma category value GC. The gamma table GT represents a respective gamma curve for implementing gamma correction. The gamma curve may represent a relationship between an input pixel value and an output pixel value. Different gamma tables GTs can be obtained for different pixel locations PXLs even the pixel locations or pixels PXs correspond to the same gamma category value GC. The gamma table GT can be implemented in any known manner. For example, the gamma table GT may be implemented in hardware or software.

The compensation circuit 16 is configured to compensate an input pixel value PXI of the pixel PX, so as to generate an output pixel value PXO corresponding to the pixel location PXL by referring to the gamma table GT.

Specifically, for a pixel $PX_{(m,n)}$ within the plurality of pixels PX of the video frame VF, the receiving circuit 12 may obtain a pixel location $PXL_{(m,n)}$ corresponding to the pixel $PX_{(m,n)}$ and obtain a gamma category value $GC_{(m,n)}$ corresponding to the pixel $PX_{(m,n)}$, where the gamma category value $GC_{(m,n)}$ may be either the gamma-high value GH or the gamma-low value GL. The gamma table circuit 14 may obtain a gamma table $GT_{(m,n)}$ for (or corresponding to) the pixel location $PXL_{(m,n)}$ according to the gamma category value $GC_{(m,n)}$, such that the compensation circuit 16 outputs an output pixel value $PXO_{(m,n)}$ corresponding to the pixel location $PXL^{(m,n)}$ by referring to the gamma table $GT_{(m,n)}$ corresponding to the pixel location $PXL_{(m,n)}$.

In another perspective, the gamma table $GT_{(m,n)}$ corresponding to the pixel location $PXL_{(m,n)}$ is either a gamma-high table GT_H or a gamma-low table GT_L. The gamma table circuit 14 determines whether the gamma table $GT_{(m,n)}$ is the gamma-high table GT_H or the gamma-low table GT_L according to the gamma category value $GC_{(m,n)}$ corresponding to the pixel location $PXL_{(m,n)}$.

The gamma table circuit 14 may obtain the gamma table $GT_{(m,n)}$ from a plurality of gamma tables GT. The plurality of gamma tables GT may comprise a plurality of gamma-high tables GT_H and a plurality of gamma-low tables GT_L. The plurality of gamma-high tables GT_H can be mutually different from each other, and the plurality of gamma-low tables GT_L can be mutually different from each other. If the gamma category value $GC_{(m,n)}$ is equal to the gamma-high value GH, the gamma table circuit 14 may obtain one gamma-high table GT_H (among the plurality of gamma-high tables GT_H) as the gamma table $GT_{(m,n)}$ corresponding to the pixel location $PXL_{(m,n)}$. If the gamma category value $GC_{(m,n)}$ is equal to the gamma-low value GL, the gamma table circuit 14 may obtain one gamma-low table GT_L (among the plurality of gamma-low tables GT_L) as the gamma table $GT_{(m,n)}$ corresponding to the pixel location $PXL_{(m,n)}$.

In other words, within the plurality of pixels PX, there are a plurality of first pixel locations PXL_H, corresponding to the gamma-high value GH, and a plurality of second pixel locations PXL_L, which is corresponding to the gamma-low value GL. The gamma table circuit 14 may obtain the plurality of gamma-high tables GT_H for (or corresponding to) the plurality of first pixel locations PXL_H, and obtain the plurality of gamma-low tables GT_L for (or corresponding to) the second pixel locations PXL_L. In this case, the plurality of gamma-high tables GT_H corresponding to the plurality of first pixel locations PXL_H may be mutually different from each other, and the plurality of gamma-low tables GT_L corresponding to the plurality of second pixel locations PXL_L may be mutually different from each other as well.

Figure 2:
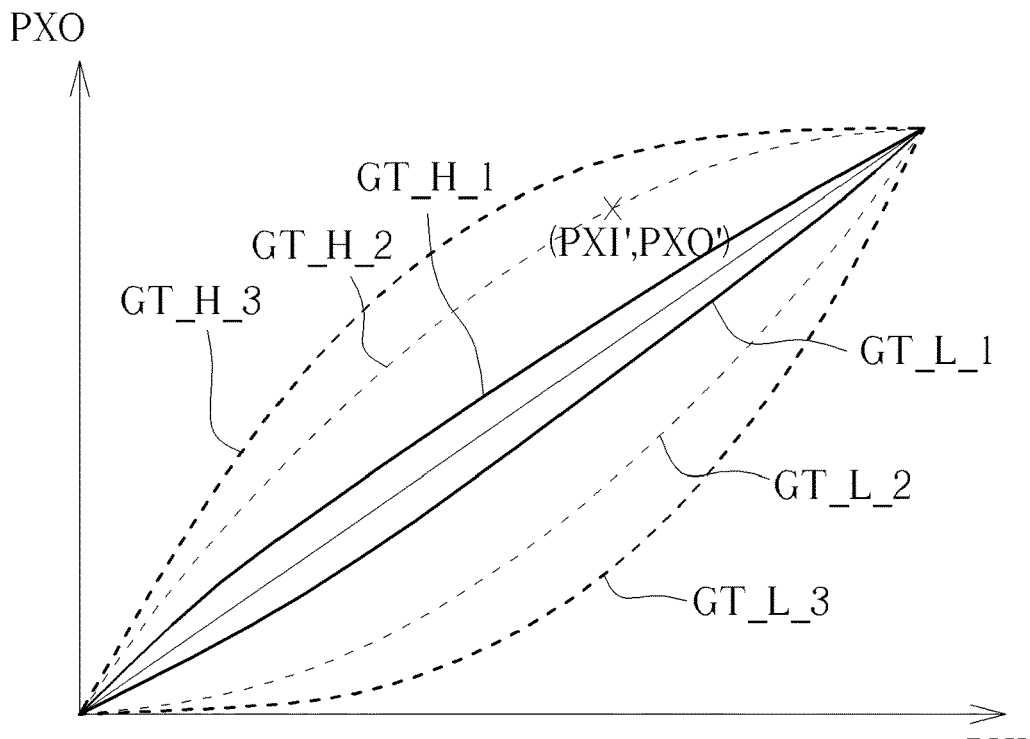
FIG. 2 illustrates gamma-high tables and gamma-low tables according to an embodiment of the present invention.

For example, FIG. 2 illustrates gamma-high tables GT_H_1-GT_H_3 and gamma-low tables GT_L_1-GT_L_3 according to an embodiment of the present invention. Within the plurality of pixels PX of the video frame VF, it may exist first pixel locations PXL_H_1-PXL_H_3 corresponding to the gamma-high value GH and second pixel locations PXL_L_1-PXL_L_3 corresponding to the gamma-low value GL. The gamma table circuit 14 may obtain the gamma-high tables GT_H_1-GT_H_3 for (or corresponding to) the first pixel locations PXL_H_1-PXL_H_3, respectively, and obtain the gamma-low tables GT_L_1-GT_L_3 for (or corresponding to) the second pixel locations PXL_L_1-PXL_L_3, respectively. As can be seen from FIG. 2, the plurality of gamma-high tables GT_H_1-GT_H_3 corresponding to the first pixel locations PXL_H_1-PXL_H_3 are mutually different, and the plurality of gamma-low tables GT_L_1-GT_L_3 corresponding to the second pixel locations PXL_L_1-PXL_L_3 are mutually different.

In another perspective, in the embodiment of FIG. 2, the gamma-high table GT_H_x and the gamma-low table GT_L_x may form a gamma table pair GTP_x, where x=1, 2, 3. The gamma table pair GTP_x comprising the gamma-high table GT_H_x and the gamma-low table GT_L_x may be corresponding to a gamma deviation degree GDD_x. That is, the gamma deviation degrees GDD_1-GDD_3 are corresponding to the gamma table pairs GTP_1-GTP_3.

Generally speaking, in the embodiment, the plurality of gamma tables GT may comprise the plurality of gamma-high tables GT_H and the plurality of gamma-low tables GT_L, and the plurality of gamma-high tables GT_H and the plurality of gamma-low tables GT_L may form a plurality of gamma table pairs GTP. Each gamma table pair GTP comprises one gamma-high table GT_H and one gamma-low table GT_L.

Figures 3, 4:
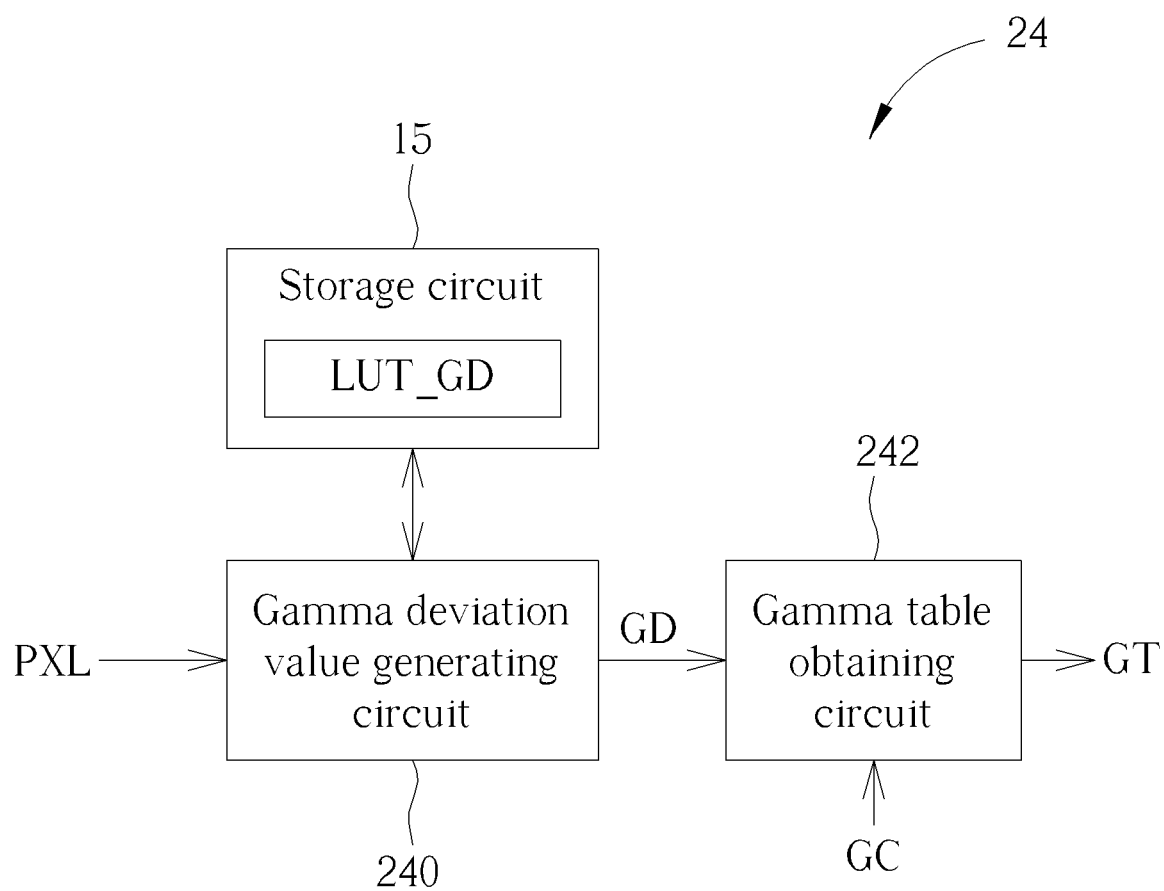
FIG. 3 illustrates three possible partial portion of a look-up table according to an embodiment of the present invention.
FIG. 4 is a schematic diagram of a gamma table circuit according to an embodiment of the present invention.

In an embodiment, a total number of the plurality of first pixel locations PXL_H is equal to a total number of the plurality of second pixel locations PXL_L, and the plurality of first pixel locations PXL_H and the plurality of second pixel locations PXL_L are alternatively arranged in the video frame VF. The pattern/arrangement alternating the plurality of first pixel locations PXL_H and the plurality of second pixel locations PXL_L is not limited. For example, FIG. 3 illustrates three possible partial portion of the look-up table LUT_GC. In FIG. 3, each grid represents one pixel location PXL, and a grid with "H/L" therein represents that grid is a high/second pixel location PXL_H/PXL_L.

In an embodiment, the plurality of gamma tables GT are all pre-generated and can be pre-stored in a second storage circuit 13 (e.g. read only memory, ROM) within the image processing circuit 10. The gamma table circuit 14 may obtain a gamma deviation value GD corresponding to the pixel location PXL and obtain the gamma table GT from the plurality of pre-stored gamma table pairs GTP according to the gamma category value GC and the gamma deviation value GD corresponding to the pixel location PXL, where each pre-stored gamma table pair GTP comprises a pre-stored gamma-high table GT_H and a pre-stored gamma-low table GT_L.

The gamma table circuit 14 may access (or refer to) a look-up table LUT_GD to obtain the gamma deviation value GD corresponding to the pixel location PXL. For example, the gamma table circuit 14 may refer to the look-up table LUT_GD to obtain the gamma deviation value GD corresponding to the pixel location PXL. The look-up table LUT_GD may represent relationship between different pixel locations and different gamma deviation values. The look-up table LUT_GD can be implemented in any known manner. For example, the gamma table GT may be implemented in hardware or software. In an embodiment, the look-up table LUT_GD may be stored in a third storage circuit 15, e.g., registers, within the image processing circuit 10, but not limited thereto. In an embodiment, the look-up table LUT_GC and the look-up table LUT_GD may be separated look-up tables. In an alternative embodiment, the look-up table LUT_GC and the look-up table LUT_GD may be integrated as one integrated look-up table LUT_GC_GD.

In an embodiment, the gamma table circuit 14 may select a selected pre-stored gamma table pair GTP$^{(S)}$ from the plurality of pre-stored gamma table pairs GTP according to the gamma deviation value GD, where the selected pre-stored gamma table pair GTP$^{(S)}$ comprises a selected pre-stored gamma-high table GT_H$^{(S)}$ and a selected pre-stored gamma-low table GT_L$^{(S)}$, and then the gamma table circuit 14 may further determine the gamma table GT to be the selected pre-stored gamma-high gamma table GT_I H$^{(S)}$ or the selected pre-stored gamma-low gamma table GT_L$^{(S)}$ according to the gamma category value GC corresponding to the pixel location PXL. In an alternative embodiment, the gamma table circuit 14 may determine the gamma table GT according to the gamma category value GC first and then determine the gamma table GT according to the gamma deviation value GD, which is also within the scope of the present invention.

For example, suppose that the gamma-high tables GT_H_1-GT_H_3 and the gamma-low tables GT_L_1-GT_L_3 are pre-stored in the second storage circuit 13 within the image processing circuit 10, when the receiving circuit 12 accesses the look-up table LUT_GC to obtain the gamma category value GC$_{(m,n)}$ corresponding to the pixel location PXL$_{(m,n)}$ to be gamma-high value GH and the gamma table circuit 14 accesses the look-up table LUT_GD to obtain the gamma deviation value GD$_{(m,n)}$ corresponding to the gamma deviation degree GDD_1, the gamma table circuit 14 would obtain the gamma table GT$_{(m,n)}$ to be the pre-stored gamma-high table GT_H_1. Hence, the compensation circuit 16 outputs the output pixel value PXO$_{(m,n)}$ corresponding to the pixel location PXL$_{(m,n)}$ by referring to the pre-stored gamma-high table GT_H_1.

In an embodiment, a total number of first pixel locations PXL_H corresponding to a specific gamma deviation value GD' is equal to a total number of second pixel locations PXL_L corresponding to the specific gamma deviation value GD', and the first pixel locations PXL_H corresponding to the specific gamma deviation value GD' and the plurality of second pixel locations PXL_L corresponding to the specific gamma deviation value GD' are alternatively arranged in the video frame VF.

For example, a plurality of first pixel locations PXL_H_x are first pixel locations corresponding to the gamma-high tables GT_H_x, and equivalently, corresponding to a specific gamma deviation value GD_x. Similarly, a plurality of second pixel locations PXL_L_x are second pixel locations corresponding to the gamma-low tables GT_L_x, and equivalently, corresponding to the specific gamma deviation value GD_x. In this case, a total number of the plurality of first pixel locations PXL_H_x is equal to a total number of the plurality of second pixel locations PXL_L_x.

Similarly, the pattern/arrangement/scattering of the plurality of first pixel locations PXL_H_x (corresponding to the gamma deviation value GD_x) and the plurality of second pixel locations PXL_L (corresponding to the gamma deviation value GD_x), over the video frame VF, is not limited.

The implementation of the gamma table circuit 14 can be realized according to designed requirements and is so not limited. FIG. 4 is a schematic diagram of a gamma table circuit 24 according to an embodiment of the present invention. The gamma table circuit 24 can be used to realize the gamma table circuit 14. The gamma table circuit 24 comprises a gamma deviation value generating circuit 240 and a gamma table obtaining circuit 242. The gamma deviation value generating circuit 240 is configured to obtain the gamma deviation value GD corresponding to the pixel location PXL by accessing the third storage circuit 15 within the image processing circuit 10 to refer to the look-up table LUT_GD. The gamma table obtaining circuit 242 is configured to obtain the gamma table GT (corresponding to the pixel location PXL) from the plurality of pre-stored gamma table pairs GTP, according to the gamma category value GC and the gamma deviation value GD.

In a short remark, when two first pixel locations PXL_a and PXL_b corresponding to the gamma-high value GH have the same input pixel value (i.e., PXI_a=PXI_b) but different gamma deviation values (i.e., GD_a≠GD_b), two output pixel values PXO_a and PXO_b, corresponding to the two first pixel locations PXL_a and PXL_b, respectively, may be different, i.e., PXO_a≠PXO_b. Similarly, two second pixel locations PXL_c and PXL_d corresponding to the gamma-low value GL have the same input pixel value (i.e., PXI_c=PXI_d) but different gamma deviation values (i.e., GD_c≠GD_d), two output pixel values PXO_c and PXO_d, corresponding to the two second pixel locations PXL_c and PXL_d, respectively, may be different, i.e., PXO_c≠PXO_d.

Note that, the gamma table pairs GTP do not have to be pre-stored. Some of the gamma table pairs GTP can be generated, by the gamma table circuit 14.

In an embodiment, the second storage circuit 13 (e.g. ROM) within the image processing circuit 10 may pre-store one gamma table pair GTP, e.g., a pre-stored gamma table pair $GTP^{(pre)}$. Based on the pre-stored gamma table pair $GTP^{(pre)}$, the gamma table circuit 14 may generate/compute the plurality of gamma tables GT according to a weighting value w corresponding to the pixel location PXL.

For example, in an embodiment, the gamma table pair GTP_1 illustrated in FIG. 2 may be pre-stored in the storage circuit (e.g. ROM) within the gamma table circuit 14. The gamma table pairs GTP_2, GTP_3 may be corresponding to weighting values w_2, w_3, respectively. The gamma table circuit 14 may generate/compute the gamma table pairs GTP_2, GTP_3 according to the weighting values w_2, w_3, based on the pre-stored gamma table pair GTP_1.

In this case, the gamma table pairs GTP_2 and GTP_3 represent mapping relationship between the input pixel value PXI and the output pixel value PXO. Take the gamma table pair GTP_2 as an example, the gamma table circuit 14 does not have to generate the entire gamma table pair GTP_2 at one time. For an input pixel value PXI' corresponding to a pixel location PXL', as long as the compensation circuit 16 can generate an output pixel value PXO' corresponding to the input pixel value PXI' such that the mapping relationship between the input pixel value PXI' and the output pixel value PXO' complies with the mapping relationship specified by the gamma table pair GTP_2, e.g., the gamma-high table GT_H_2 (as shown in FIG. 2), it can be regarded as the gamma table circuit 14 obtaining the gamma-high table GT_H_2 for the pixel location PXL'.

The gamma table circuit 14 may access (or refer to) a look-up table LUT_w to obtain a weighting value w corresponding to the pixel location PXL. The look-up table LUT_w may represent relationship between different pixel locations and different gamma deviation values. The look-up table LUT_w can be implemented in any known manner. For example, the LUT_w may be implemented in hardware or software. In an embodiment, the look-up table LUT_w may be stored in a fourth storage circuit 17, e.g., registers, within the image processing circuit 10, but not limited thereto. Similarly, the look-up table LUT_GC and the look-up table LUT_w may be separated look-up tables, or the look-up table LUT_GC and the look-up table LUT_w may be integrated as one integrated look-up table LUT_GC_w.

In an embodiment, a total number of first pixel locations PXL_H corresponding to a specific weighting value w' is equal to a total number of second pixel locations PXL_L corresponding to the specific weighting value w', and the first pixel locations PXL_H corresponding to the specific weighting value w' and the plurality of second pixel locations PXL_L corresponding to the weighting value w' are alternatively arranged in the video frame VF.

Figure 5:
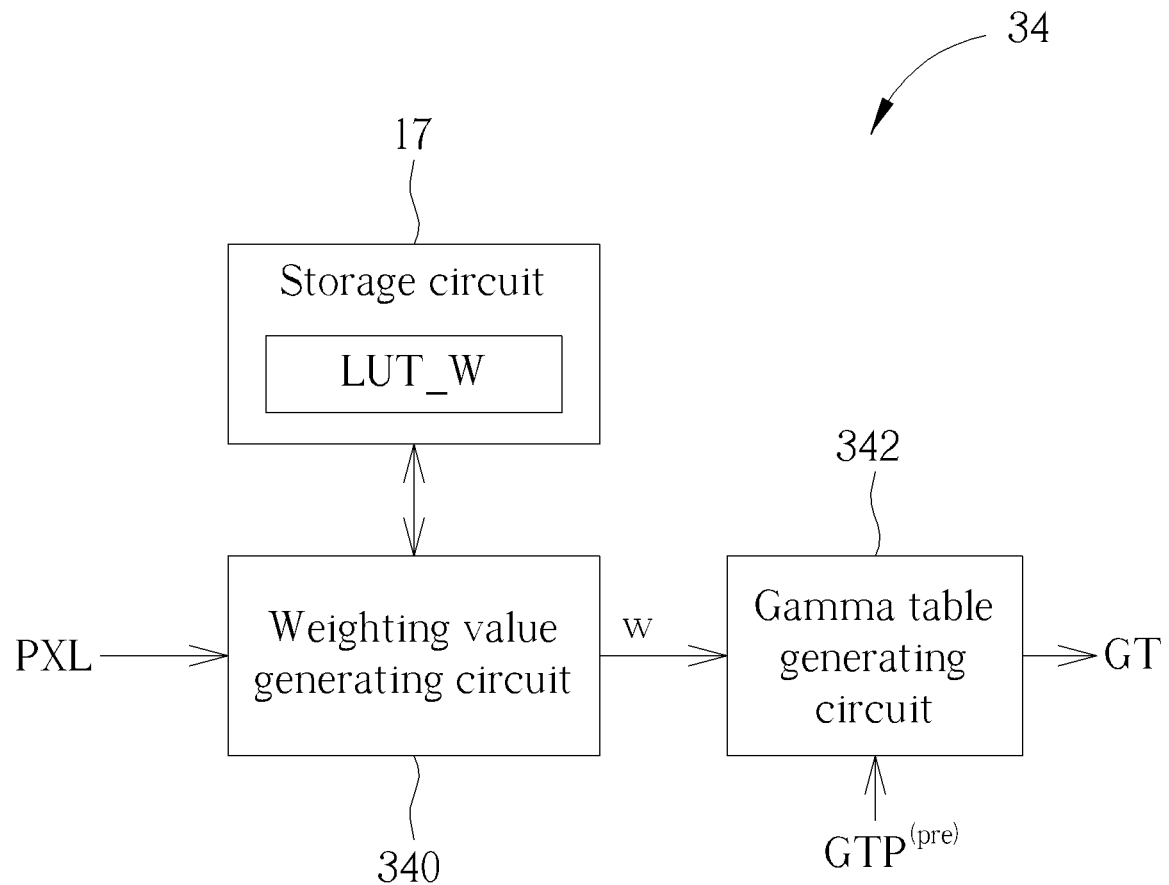
FIG. 5 is a schematic diagram of a gamma table circuit according to an embodiment of the present invention.

The implementation of the gamma table circuit 14 can be realized according to design requirements and is so not limited. FIG. 5 is a schematic diagram of a gamma table circuit 34 according to an embodiment of the present invention. The gamma table circuit 34 may comprise a weighting value generating circuit 340 and a gamma table generation circuit 342. The weighting value generating circuit 340 is configured to obtain the weighting value w corresponding to the pixel location PXL by accessing the fourth storage circuit 17 within the image processing circuit 10 to refer to the look-up table LUT_w. The gamma table generation circuit 342 is configured to generate the gamma table GT (corresponding to the pixel location PXL) according to the pre-stored gamma table pair $GTP^{(pre)}$ and the weighting value w.

The method of generating the gamma table GT according to the pre-stored gamma table pair $GTP^{(pre)}$ is not limited. The gamma table generation circuit 342 may perform a specific combination operation of the pre-stored gamma-high table and the pre-stored gamma-low table of the pre-stored gamma table pair $GTP^{(pre)}$, and the specific combination operation is related to the weighting value w.

In addition, the second storage circuit 13 within the image processing circuit 10 may pre-store a plurality of gamma table pairs $GTP^{(pre)}$. The gamma table generation circuit 342 may perform a specific combination operation of the plurality of pre-stored gamma-high tables and the plurality of pre-stored gamma-low tables of the plurality of pre-stored gamma table pairs $GTP^{(pre)}$, and the specific combination operation is related to the weighting value w.

In a short remark, when two first pixel locations PXL_a and PXL_b corresponding to the gamma-high value GH have the same input pixel value (i.e., PXI_a=PXI_b) but different weighting values (i.e., w_a≠w_b), two output pixel values PXO_a and PXO_b, corresponding to the two first pixel locations PXL_a and PXL_b, respectively, may be different, i.e., PXO_a≠PXO_b. Similarly, two second pixel locations PXL_c and PXL_d corresponding to the gamma-low value GL have the same input pixel value (i.e., PXI_c=PXI_d) but different weighting values (i.e., w_c≠w_d), two output pixel values PXO_c and PXO_d, corresponding to the two second pixel locations PXL_c and PXL_d, respectively, may be different, i.e., PXO_c≠PXO_d.

Figure 6:
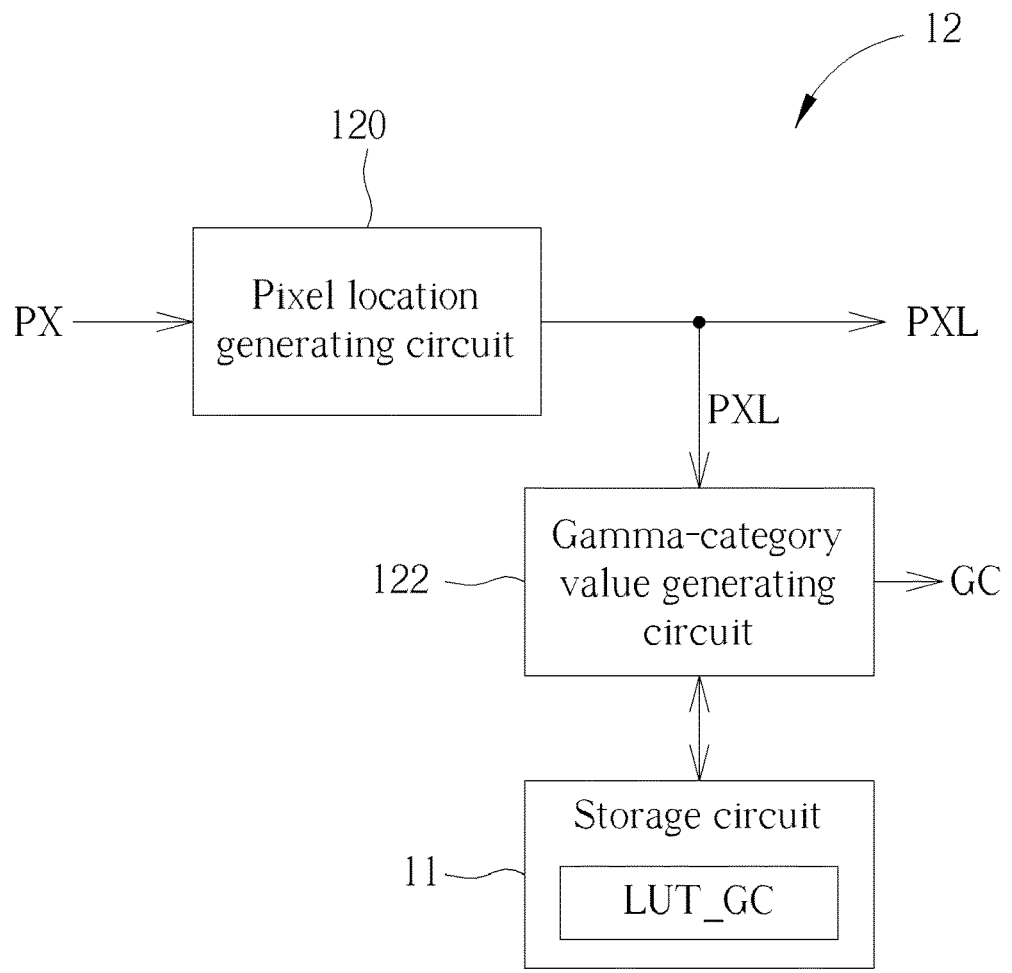
FIG. 6 is a schematic diagram of a receiving circuit according to an embodiment of the present invention.
Figure 7:
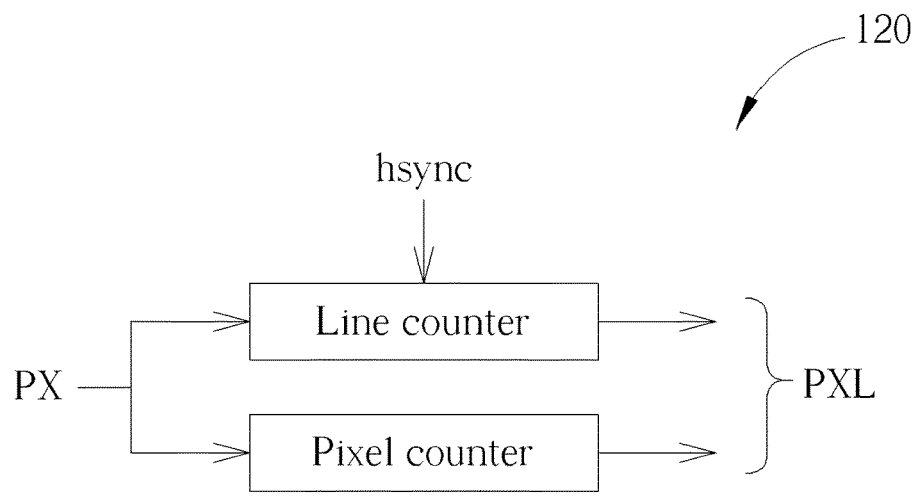
FIG. 7 is a schematic diagram of a pixel location generating circuit according to an embodiment of the present invention.

In addition, the structure of the receiving circuit 12 is not limited. For example, the receiving circuit 12 may comprises a pixel location generating circuit 120 and a gamma-category value generating circuit 122, as FIG. 6 illustrates. The gamma-category value generating circuit 122 is configured to obtain a plurality of gamma category values corresponding to the plurality of pixel locations PXL by accessing the first storage circuit 11 within the image processing circuit 10 to refer to the look-up table LUT_GC. The pixel location generating circuit 120 is configured to generate the plurality of pixel locations PXL corresponding to the plurality of pixels PX. Specifically, as illustrated in FIG. 7, the pixel location generating circuit 120 may comprise a line counter 1200 and a pixel counter 1202. The line counter 1200 receives a synchronous signal hsync, configured to output a first coordinate, e.g., horizontal coordinate, of the pixel location PXL. The pixel counter 1202 is configured to output a second coordinate, e.g., vertical coordinate, of the pixel location.

Figure 8:
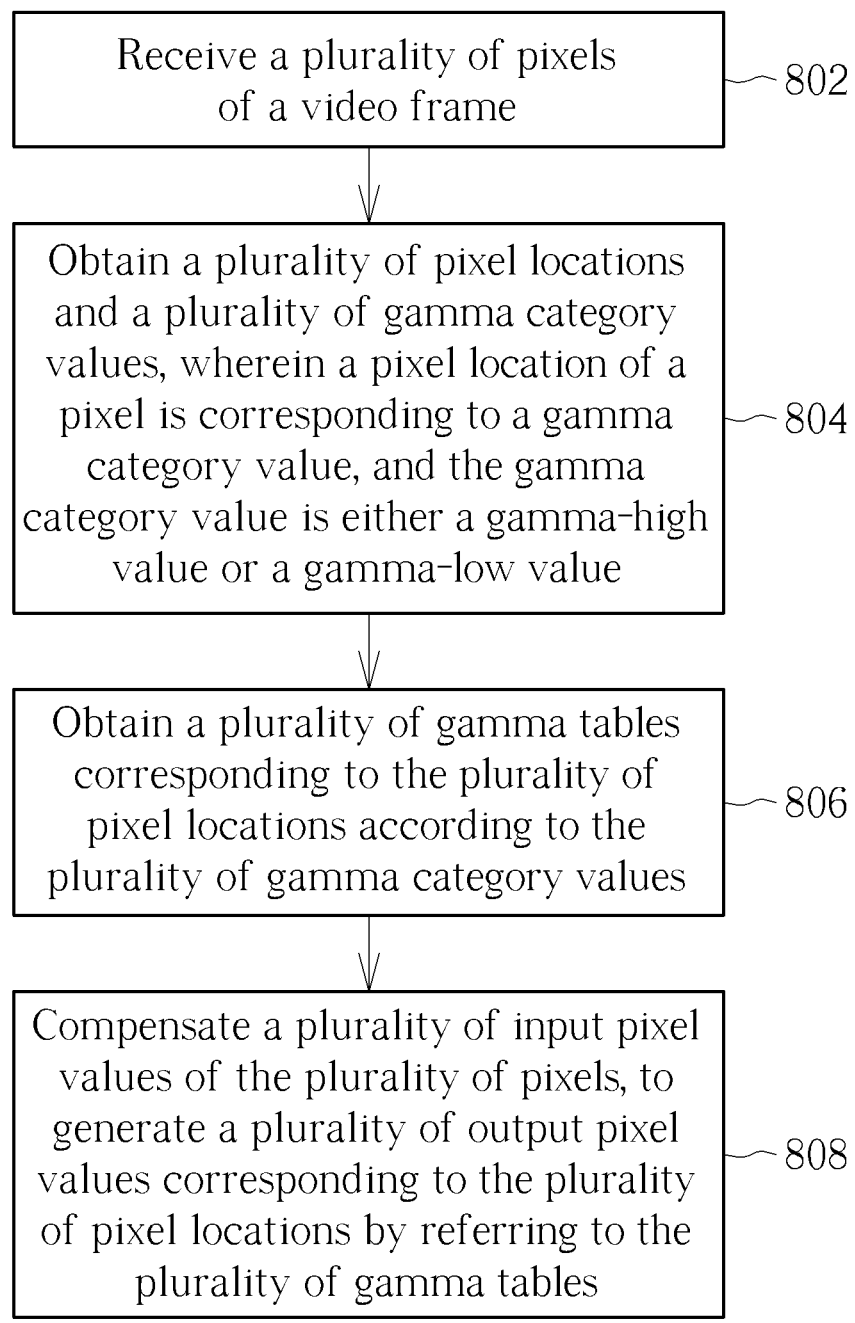
FIG. 8 is a schematic diagram of an image processing method according to an embodiment of the present invention.

Operations of the image processing circuit 10 can be summarized as an image processing method 80, illustrated in FIG. 8. The image processing method 80 comprises the following steps.

Step 802: Receive a plurality of pixels of a video frame.

Step 804: Obtain a plurality of pixel locations and a plurality of gamma category values, wherein a pixel location of a pixel is corresponding to a gamma category value, and the gamma category value is either a gamma-high value or a gamma-low value.

Step 806: Obtain a plurality of gamma tables corresponding to the plurality of pixel locations according to the plurality of gamma category values.

Step 808: Compensate a plurality of input pixel values of the plurality of pixels, to generate a plurality of output pixel values corresponding to the plurality of pixel locations by referring to the plurality of gamma tables.

Step 802 and Step 804 may be executed by the receiving circuit 12. Step 806 may be executed by the gamma table circuit 14. Step 808 may be executed by the compensation circuit 16.

The image processing circuit 10 performing the method 80 is actually to randomize the pixels values, in comparison to input pixel values, by referring to the plurality of gamma tables for the plurality of pixel location. In a perspective, the pixels value randomization is performed in spatial domain. Randomizing the output pixels values would effectively mitigate or eliminate the unwanted grid phenomenon.

It is noted the invention is not limited to the embodiments. Any implementations capable of more randomizing pixels in the spatial domain can be realized. For example, any circuits or methods obtaining more gamma curves/tables (more than only a single high gamma curve/table and a single low gamma curve/table) can be implemented, not limited to the above embodiments.

In summary, the image processing circuit of the embodiments can perform gamma compensation on pixels values according to different gamma tables even though the pixels correspond to the same gamma category type. In other words, the pixel values can be more randomized effectively in spatial domain, so as to mitigate or eliminate the unwanted grid phenomenon.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing circuit, comprising:
   a receiving circuit, configured to receive a plurality of pixels of a video frame, wherein the plurality of pixels are corresponding to a plurality of pixel locations, a pixel location of a pixel is corresponding to a gamma category value, and the gamma category value is either a gamma-high value or a gamma-low value; and
   a gamma table circuit, configured to obtain a gamma table corresponding to the pixel location according to the gamma category value; and
   a compensation circuit, configured to compensate an input pixel value of the pixel, to generate an output pixel value corresponding to the pixel location by referring to the gamma table;
   wherein a plurality of first pixel locations are corresponding to the gamma-high value, the plurality of first pixel locations are corresponding to a plurality of gamma-high tables referred to by the compensation circuit, and the plurality of gamma-high tables corresponding to the plurality of first pixel locations are mutually different;
   wherein a plurality of second pixel locations are corresponding to the gamma-low value, the plurality of second pixel locations are corresponding to a plurality of gamma-low tables referred to by the compensation circuit, and the plurality of gamma-low tables corresponding to the plurality of second pixel locations are mutually different.

2. The image processing circuit of claim 1, wherein the gamma table circuit obtains the gamma table among a plurality of gamma tables, and the plurality of gamma tables comprises the plurality of gamma-high tables and the plurality of gamma-low tables.

3. The image processing circuit of claim 1, wherein the receiving circuit is configured to obtain the gamma category value (High/Low) corresponding to the pixel location by referring to a look-up table.

4. The image processing circuit of claim 1, wherein the gamma table circuit is configured to obtain the gamma table according to at least one pre-stored gamma table pair.

5. The image processing circuit of claim 1, wherein the gamma table corresponding to the pixel location is either a gamma-high table or a gamma-low table, the gamma table circuit determines whether the gamma table is the gamma-high table or the gamma-low table according to the gamma category value corresponding to the pixel location.

6. The image processing circuit of claim 5, wherein the gamma table circuit is further configured to obtain a gamma deviation value corresponding to the pixel location and obtain the gamma table from a plurality of pre-stored gamma table pairs according to the gamma category value and the gamma deviation value corresponding to the pixel location, wherein a plurality of pre-stored gamma table pairs comprise a plurality of pre-stored gamma-high gamma tables and a plurality of pre-stored gamma-low gamma tables.

7. The image processing circuit of claim 6, wherein the plurality of pre-stored gamma-high tables are mutually different, and the plurality of pre-stored gamma-low tables are mutually different.

8. The image processing circuit of claim 6, wherein the gamma table circuit is configured to select a selected pre-stored gamma table pair among the plurality of pre-stored gamma table pairs according to the gamma deviation value, the selected pre-stored gamma table pair comprises a selected pre-stored gamma-high gamma table and a selected pre-stored gamma-low gamma table, and the gamma table circuit is configured to determine the gamma table to be the selected pre-stored gamma-high gamma table or the selected pre-stored gamma-low gamma table according to the gamma category value.

9. The image processing circuit of claim 6, wherein the gamma table circuit is configured to obtain the gamma deviation value corresponding to the pixel location by referring to a look-up table.

10. The image processing circuit of claim 6, wherein the gamma deviation value represents one gamma deviation degree among a plurality of gamma deviation degrees, and the plurality of gamma deviation degrees are corresponding to the plurality of pre-stored gamma table pairs.

11. The image processing circuit of claim 1, wherein the gamma table circuit is further configured to obtain a weighting value corresponding to the pixel location and generate the gamma table corresponding to the pixel location according to the weighting value.

12. The image processing circuit of claim 11, wherein the gamma table circuit is configured to obtain the weighting value corresponding to the pixel location by referring to a look-up table.

13. The image processing circuit of claim 1, wherein a total number of the plurality of first pixel locations is equal to a total number of the plurality of second pixel locations, and the plurality of first pixel locations and the plurality of second pixel locations are alternatively arranged in the video frame.

14. The image processing circuit of claim 1, wherein the receiving circuit comprises:
   a pixel location generating circuit, configured to generate the plurality of pixel locations corresponding to the plurality of pixels; and a gamma-category value generating circuit, configured to obtain a plurality of gamma category values corresponding to the plurality of pixel locations by referring to a look-up table.

15. The image processing circuit of claim 14, wherein the pixel location generating circuit comprises:
   a line counter, receiving a synchronous signal, configured to output a first coordinate of the pixel location; and
   a pixel counter, configured to output a second coordinate of the pixel location.

16. The image processing circuit of claim 1, wherein the gamma table circuit comprises:
   a gamma deviation value generating circuit, configured to obtain a gamma deviation value corresponding to the pixel location by referring to a look-up table; and
   a gamma table obtaining circuit, configured to obtain the gamma table from a plurality of pre-stored gamma table pairs according to the gamma category value and the gamma deviation value, wherein a pre-stored gamma table pair comprises a pre-stored gamma-high gamma table and a pre-stored gamma-low gamma table.

17. The image processing circuit of claim 1, wherein the gamma table circuit comprises:
   a weighting value generating circuit, configured to obtain a weighting value corresponding to the pixel location by referring to a look-up table; and
   a gamma table generation circuit, configured to generate the gamma table according to a pre-stored gamma table pair and the weighting value.

18. The image processing circuit of claim 1, wherein
   when two first pixel locations have the same input pixel value but different gamma deviation values, two output pixel values corresponding to the two first pixel locations are different;
   when two second pixel locations have the same input pixel value but different gamma deviation values, two output pixel values corresponding to the two second pixel locations are different.

19. An image processing method for an image processing circuit comprising:
   receiving a plurality of pixels of a video frame;
   obtaining a plurality of pixel locations and a plurality of gamma category values, wherein a pixel location of a pixel is corresponding to a gamma category value, and the gamma category value is either a gamma-high value or a gamma-low value;
   obtaining a plurality of gamma tables corresponding to the plurality of pixel locations according to the plurality of gamma category values; and
   compensating a plurality of input pixel values of the plurality of pixels by a compensation circuit, to generate a plurality of output pixel values corresponding to the plurality of pixel locations by referring to the plurality of gamma tables;
   wherein a plurality of first pixel locations are corresponding to the gamma-high value, the plurality of first pixel locations are corresponding to a plurality of gamma-high tables referred to by the compensation circuit, and the plurality of gamma-high tables corresponding to the plurality of first pixel locations are mutually different;
   wherein a plurality of second pixel locations are corresponding to the gamma-low value, the plurality of second pixel locations are corresponding to a plurality of gamma-low tables referred to by the compensation circuit, and the plurality of gamma-low tables corresponding to the plurality of second pixel locations are mutually different.

20. The image processing method of claim 19, wherein a total number of the plurality of first pixel locations is equal to a total number of the plurality of second pixel locations, and the plurality of first pixel locations and the plurality of second pixel locations are alternatively arranged in the video frame.

21. The image processing method of claim 19, wherein
   when two first pixel locations have the same input pixel value but different gamma deviation values, two output pixel values corresponding to the two first pixel locations are different;
   when two second pixel locations have the same input pixel value but different gamma deviation values, two output pixel values corresponding to the two second pixel locations are different.

* * * * *